3,033,675
INCREASING PRECIOUS METAL RECOVERY
IN CYANIDATION
Norman Hedley, Stamford, Conn., assignor to American
Cyanamid Company, New York, N.Y., a corporation
of Maine
No Drawing. Filed Nov. 3, 1958, Ser. No. 771,208
8 Claims. (Cl. 75—107)

This invention relates to the use of polyelectrolytes to increase the precipitating efficiency of zinc dust in recovering precious metals from cyanide solutions obtained in extractive metallurgy.

In the mining of gold and silver many processes are used to extract these precious metals from ores. In many of these processes the ore is sorted, appropriately ground, and the gold and silver are dissolved in a dilute cyanide solution. The treatment of ore may include hand sorting, various attrition processes, flotation, and classification, roasting and other treatments. After these treatments, sands and slimes or both are extracted with cyanide solutions to dissolve the precious metal values. The process of solution may involve direct extraction, countercurrent extraction, or stage extractions. All of these processes are conventional in the treatment of precious metal ores. Details of various processes which have been used appear in the literature. A text "Cyanidation and Concentration of Gold and Silver Ores," John V. N. Dorr, McGraw-Hill Book Company, New York, 1936, describes in detail a number of these processes.

The cyanide solution used for extraction contains sodium cyanide or calcium cyanide which may be either a pure or technical grade. Usually a certain amount of lime is added to the solution.

The cyanide solution, after extracting the precious metal values from the ores, is separated from residual solids by settling or filtration and is treated with zinc dust to precipitate out the precious metals. Before the precipitation, the gold and silver containing cyanide solution, called the pregnant solution, is deaerated. The zinc is used as a finely divided zinc dust. Usually, a small amount of a lead salt, such as lead nitrate, is added to the zinc to activate the zinc. The zinc in part dissolves, and causes the precipitation of the free precious metals. The precipitated precious metals are then filtered or otherwise separated from the solution, now termed the barren solution. The barren solution usually contains sufficient cyanide and precious metals so that it is economical to either recycle at least part of this solution to the extraction stages or use it for washing of the finely-divided ore to displace the rich pregnant solution, or both. Part of the barren solution is lost to waste, or remains with the leached solids and is lost.

It has now been found that the introduction of a small amount of a polyelectrolyte having a structure derived by the substantially linear polymerization of at least one monoolefinic compound through the aliphatic unsaturated group gives improved efficiency in the precipitation of precious metals with the zinc. For best results, the polyelectrolyte should be dissolved in water, and added to the zinc dust before the zinc dust is added to the pregnant solution. The polymer can be added before, during or after the activation of the zinc dust with the soluble lead salt. Conveniently, the polyelectrolyte and the lead salt are added in solution to the zinc dust just before the zinc dust is added as a suspension to the deaerated pregnant solution.

The use of the polyelectrolyte tends to: (1) lower the consumption of zinc dust; (2) give a more complete precipitation of gold and silver; (3) reduce the cyanide losses; (4) increase the grade of gold and/or silver precipitate; and simplify the smelting of the precious metal concentrate. Inasmuch as the operating conditions vary from mine to mine depending upon the characteristics of the ores and the process included, it can be seen that part or all of the improvement resulting from the use of the polyelectrolyte can be channelled into increasing of the efficiency of any of these steps. Usually the increase in efficiency is apportioned in part to all of these advantages rather than improving only one phase disproportionately.

Usually, gold and silver are found together, so both are recovered in the present process. With those rare ores that have only gold or silver and not both, the present process can be used to recover the single precious metal.

The same classes of polymers are effective for increasing the efficiency of the zinc precipitation of the precious metals as are disclosed for use earlier to prevent deposition of alkaline earth metal salts as disclosed in United States Patent 2,729,557, Booth and Hedley, "Method of Preventing Deposition of Alkaline Earth Metal Salts in Cyanidation of Precious Metal Ores."

Particularly suitable polyelectrolytic polymers for use in the present invention are the polymers of acrylic or methacrylic acid derivatives, for example, acrylic acid, the alkali metal and ammonium salts of acrylic acid, methacrylic acid, the alkali metal and ammonium salts of methacrylic acid, acrylamide, methacrylamide, the N-alkyl substituted amides, the N-aminoalkylamides, and the corresponding N-alkylaminoalkyl substituted amides, the aminoalkyl acrylates, the aminoalkyl methacrylamides and the N-alkyl substituted aminoalkyl esters of either acrylic or methacrylic acids. These polymeric compositions may be homopolymers or they may be copolymers with other copolymerizing monomers such as ethylene, propylene, isobutylene, styrene, α-methylstyrene, vinyl acetate, vinyl formate, alkyl ethers, acrylonitrile, methacrylonitrile, vinyl chloride, vinylidene chloride, the alkyl acrylates, the alkyl methacrylates, the alkyl maleates, and the alkyl fumarates, and other olefinic monomers copolymerizable therewith. The copolymers of this type, having at least 50 mole percent of the acrylic or methacrylic acid derivatives, are preferred, and especially when the comonomer is hydrophobic or has no ionizable groups. Polymers of this type may be prepared directly by the polymerization of suitable monomers, or by the after chemical reaction of other polymers, for example by the hydrolysis of acrylonitrile or methacrylonitrile polymers.

In connection with the various types of polyelectrolytic polymers suitable for the practice of this invention, the hydrophilic polymer may be prepared directly by the polymerization or copolymerization of one or more of the various available organic monomers with aliphatic unsaturation, if the same compounds contain a hydrophilic group, for example carboxyl groups. Generally, more types of polyelectrolytic polymers can be prepared by subsequent reactions of polymers and copolymers. For example, polymers containing nitrile groups may be hydrolyzed to form water-soluble amide and carboxy containing polymers or hydrogenated to from amine containing polymers. Similarly, copolymers of maleic anhydride and vinyl acetate may be hydrolyzed to form polymers containing hydrophilic lactone rings. Other hydrophilic polymers may be prepared by the hydrolysis of copolymers of vinyl acetate wherein the acetyl groups are removed leaving hydroxy groups which promote the solubilization effect of polyelectrolytic groups present. By other reactions non-hydrophilic polymers may be converted into lactam or amide containing polymers which are more hydrophilic. Polyvinyl alcohol, not in itself a polyelectrolyte, may be converted into polyelectrolytes by esterification with dibasic acids, one of said carboxylic acid groups reacting with the alcohol radical and the other providing the hydrophilic characteristics by a carboxy group on the side chain. Still other types of polymers may be prepared by reacting halogen containing polymers, for example the polymers or copolymers of vinyl chloroacetate or vinyl chloroethyl ether, with amines to form amine salt radicals and quaternary ammonium radicals whereby hydrophilic characteristics are introduced into what otherwise would be an insoluble polymer. Other soluble polymers may be prepared by the ammonolysis of ketone containing polymers, for example polyvinyl methyl ketone. Similarly active halogen atoms may be reacted with bisulfite to substitute sulfonic acid groups for the reactive halogens.

Thus, the various polyelectrolytes of the types described above are ethylenic polymers having numerous side chains distributed along a substantially linear continuous carbon atom molecule. The side chains may be hydrocarbon groups, carboxylic acid groups or derivatives thereof, sulfonic acid groups, or derivatives thereof, phosphoric acid or derivatives thereof, heterocyclic nitrogen groups, amino-alkyl groups, alkoxy radicals and other organic groups, the number of which groups and the relative proportions of hydrophilic and hydrophobic groups being such as to provide a water-soluble polymeric compound having a substantially large number of ionizable radicals.

Among the various polymers as described above and water-soluble salts thereof useful in the practice of the present invention, there may be mentioned hydrolyzed polyacrylonitrile and polyacrylamide, sulfonated polystyrene, acrylamide-acrylic acid copolymers, polyacrylic acid, ½ calcium salt of hydrolyzed 1:1 copolymer of vinyl acetate-maleic anhydride, hydrolyzed styrene-maleic anhydride copolymer, ammonium polyacrylate, sodium polyacrylate, ammonium polymethacrylate, sodium polymethacrylate, diethanolammonium polyacrylate, guanidinium polyacrylate, dimethylaminoethyl polymethacrylate, acrylamide-acrylonitrile copolymer, methacrylic acid-dimethylaminoethyl methacrylate copolymer, sodium polyacrylate-vinyl alcohol copolymer, hydrolyzed methacrylic acid-acrylonitrile copolymer, vinyl acetate-maleic anhydride copolymer, vinyl formate-maleic anhydride copolymer, vinyl methyl ether-maleic anhydride copolymer, isobutylene-maleic anhydride copolymer, styrene-maleic anhydride copolymer, ethyl acrylate-maleic anhydride copolymer, vinyl chloride-maleic anhydride copolymer, hydrolyzed acrylonitrile-vinyl acetate copolymer, hydrolyzed acrylonitrile-methacrylonitrile copolymer, hydrolyzed acrylonitrile-methacrylonitrile-vinyl acetate terpolymer, hydrolyzed acrylonitrile-methacrylic acid copolymer, vinyl pyridine-acrylonitrile copolymer, etc. Polymers containing cation-active groups are also useful. Suitable compounds are, for example, ethyl acrylate and acrylamidopropylbenzyldimethylammonium chloride, copolymers of methylolacrylamide and acrylamidopropylbenzyldimethylammonium chloride, copolymers of butadiene and 2-vinyl pyridine, and certain quaternary compounds such as polydimethylaminostyrene quarternized with benzylchloride, allyl chloride, etc., and quaternized copolymers of vinyl alcohol and morpholinylethylvinylether and the like.

Among the especially preferred polymeric compounds are the sodium salts of hydrolyzed polyacrylonitrile, and hydrolyzed, preferably alkali hydrolyzed, polyacrylamides. Copolymers of acrylamide and acrylic acid are also highly effective. The sodium salts of hydrolyzed polyacrylonitriles may be prepared in the conventional manner, i.e., by subjecting a polyacrylonitrile to hydrolysis with sodium hydroxide, for example. The hydrolysis usually goes to about 75% completion, or in other words, about three out of every four nitrile groups are hydrolyzed to carboxylic acid groups. The hydrolyzed-polyacrylamides may be prepared by subjecting a polyacrylamide to hydrolysis either under alkali or acid conditions. That is to say, sodium hydroxide, for example, may be used, or a strong acid may be used. In either event, the hydrolysis is about 50–60% effective so that the final products consist of a hydrolyzed polymer having varying ratios of amide and carboxylic acid groups. Copolymers of acrylamide and acrylic acid are prepared by copolymerizing these two materials.

The molecular weight of the polymer is preferably much smaller than gives best results in flocculation. The best results in increasing precious metal recovery are obtained with molecular weights of under about 250,000. Molecular weights of down to 5,000 are very effective, and reasonably obtainable. When obtainable, polymers with a lower weight average molecular weight and which may contain considerable portions of monomer are effective.

Usually from about 0.05 pound of zinc are used per ton of pregnant solution. The preferred amount of polymer is from about 0.002 to 0.05 pound of polymer per ton of solution, although more may be used without deleteriously affecting precious metal recovery. The larger quantities of the polyelectrolyte are usually used with the more concentrated solutions used with larger quantities of zinc. Polymers which are added during the cyanide solution extraction of the ores tend to remain with the solids and are not effective during the zinc dust precipitation.

The low molecular weight polyelectrolyte which is added to increase the precious metal recovery is added with the zinc dust to the clear sparkling pregnant solution. The polymer is preferably added in aqueous solution as the polymer may dissolve slowly if added as a powder and the small amounts needed can be most conveniently handled as a 0.1 to 5% solution in water or cyanide solution.

The zinc dust is treated with about 10% of its weight of lead nitrate in accordance with conventional procedures. Although the lead nitrate may be added to the pregnant solution prior to the addition of the zinc, best results are obtained by treating the zinc dust with a solution of lead nitrate. Conveniently the lead nitrate as a solution is mixed with the zinc dust and the slurry added to the de-oxygenated pregnant solution. The polyelectrolyte may be added in the same aqueous slurry as the zinc dust.

While limited only by the appended claims, certain aspects of the invention are more clearly illustrated by the following examples in which parts are by weight unless otherwise specified:

EXAMPLE 1

Four liters of pregnant solution are transferred to the precipitation vessel and de-oxygenated by passing nitrogen through the solution for 10 minutes.

A weighed amount of zinc dust is transferred to a 50 milliliter beaker and suspended in 10 milliliters of water. A small amount (10% of the weight of zinc dust used) of lead nitrate is added as a 0.10% solution in water. A known amount of the polyelectrolyte is added as a 1% solution in water. The suspension of zinc dust containing the reagents is washed into the pregnant solution with a small amount of water. The pregnant solution is agitated for 25 minutes after which the precipitated precious metals and excess zinc dust are filtered off by vacuum. The filtrate (barren solution) is assayed for precious metal content. Similar tests, in which no polyelectrolyte is used, are run as controls.

Assay of pregnant solution:
  Silver _____ oz./ton__ 2.0
  NaCN _____ percent__ 0.05
  CaO _____ do____ 0.06

On one run the polyelectrolyte used was hydrolyzed polyacrylonitrile, sodium salt, having a molecular weight of about 8,000, with the following results:

Table I
SILVER PRECIPITATION

| Amount of polyelectrolyte added | | Zinc dust, lbs./ton | Barren solution silver oz./ton | Silver precipitated, Percent |
|---|---|---|---|---|
| p.p.m. | lbs./ton | | | |
| 0 | [1] 0 | 0.05 | 1.06 | 46.8 |
| 5 | 0.01 | 0.05 | 0.86 | 57.0 |
| 10 | 0.02 | 0.05 | 0.85 | 57.3 |
| 25 | 0.05 | 0.05 | 0.46 | 76.9 |
| 0 | [1] 0 | 0.075 | 0.72 | 63.8 |
| 5 | 0.01 | 0.075 | 0.10 | 95.1 |
| 10 | 0.02 | 0.075 | 0.10 | 95.1 |
| 25 | 0.05 | 0.075 | 0.06 | 97.1 |
| 0 | [1] 0 | 0.10 | 0.39 | 80.7 |
| 5 | 0.01 | 0.10 | 0.02 | 98.9 |
| 25 | 0.05 | 0.10 | 0.018 | 99.1 |

[1] Control.

EXAMPLE 2

Using the same procedure as set forth in Example 1 runs are made using a gold containing cyanide solution.

Assay of pregnant solution:
- Gold _____oz./ton__ 0.043
- NaCN _____percent__ 0.030
- CaO _____do____ 0.020

For a typical run the polyelectrolyte used was the same as in Example 1, hydrolyzed polyacrylonitrile, sodium salt, molecular weight about 8,000 with the following results:

Table II
GOLD PRECIPITATION

| Amount of polyelectrolyte | | Zinc dust, lbs./ton | Barren solution gold oz./ton | Gold precipitated, percent |
|---|---|---|---|---|
| P.p.m. | Lbs./ton | | | |
| 0 | [1] 0 | 0.075 | 0.002 | 95.4 |
| 5 | 0.01 | 0.075 | 0.008 | 98.1 |

[1] Control.

EXAMPLE 3

The procedure of Example 1 was repeated using polyacrylic acid as the polymer.

Assay of pregnant solution:
- Silver _____oz./ton__ 1.0
- NaCN _____percent__ 0.05
- CaO _____do____ 0.05

The polyelectrolyte used in this example was polyacrylic acid having a molecular weight of about 20,000 with the following results:

Table III
SILVER PRECIPITATION

| Amount of polyelectrolyte added | | Zinc dust, lbs./ton | Barren solution silver oz./ton | Silver precipitated, Percent |
|---|---|---|---|---|
| p.p.m. | lbs./ton | | | |
| 0 | [1] 0 | 0.075 | 0.178 | 82.2 |
| 2 | 0.004 | 0.075 | 0.123 | 87.7 |
| 5 | 0.010 | 0.075 | 0.014 | 98.6 |
| 0 | [1] 0 | 0.10 | 0.147 | 85.4 |
| 1 | 0.002 | 0.10 | 0.105 | 89.5 |
| 2 | 0.004 | 0.10 | 0.014 | 98.6 |
| 5 | 0.010 | 0.10 | 0.012 | 98.8 |

[1] Control.

EXAMPLE 4

Additional runs were conducted on silver solutions using the sodium salt of polyacrylonitrile of the molecular weights as indicated. The procedure otherwise was as in Example 1.

Assay of pregnant solution:
- Silver _____oz./ton__ 2.0
- NaCN _____percent__ 0.050
- CaO _____do____ 0.060

Table IV
EFFECT OF MOLECULAR WEIGHT ON SILVER PRECIPITATION

| Polyelectrolyte added, lbs./ton | Molecular weight | Zinc dust, lbs./ton | Barren solution silver, oz./ton | Silver precipitated, percent |
|---|---|---|---|---|
| 0 | (¹) | 0.05 | 1.06 | 46.8 |
| 0.01 | 8,000 | 0.05 | 0.86 | 57.0 |
| 0.01 | 250,000 | 0.05 | 1.15 | 42.4 |
| 0 | (¹) | 0.10 | 0.39 | 80.7 |
| 0.05 | 8,000 | 0.10 | 0.018 | 99.1 |
| 0.05 | 250,000 | 0.10 | 0.64 | 67.9 |

[1] Control.

EXAMPLE 5

A gold and silver containing ore 13.7 ounces of silver per short ton and 0.23 ounce of gold per short ton is ground to about 60% minus 200 mesh, and treated by counter-current decantation using a cyanide solution containing 0.16% sodium cyanide and 0.06% calcium oxide, at 25 to 30% solids. One hundred tons of ore per day are agitated in the cyanide solution for about 72 hours; the pregnant solution containing the extracted gold and silver is separated from the residual ore solids by settling and filtration.

The pregnant solution so separated assays about 4 ounces of silver and 0.07 ounce of gold per short ton. This was clarified by filtration to remove small amounts of suspended solids and then deaerated by vacuum. The deaerated pregnant solution was treated with 0.25 pound zinc dust per short ton of solution according to usual practice. The precious metal precipitate was analyzed for gold and silver content.

A second mill run was made following the same procedure but in this case 0.01 pound of 20,000 molecular weight polyacrylic acid per ton of pregnant solution was added to the zinc dust slurry before adding to the main body of pregnant solution to precipitate the precious metals. The precious metal precipitate was assayed for gold and silver content. The results are shown in Table V.

Table V
ANALYSIS OF PRECIOUS METAL PRECIPITATE WITH AND WITHOUT POLYACRYLIC ACID ADDED TO ZINC DUST

|  | No polyacrylic acid | 0.01 lb. polyacrylic acid per short ton of solution |
|---|---|---|
| Kg. gold per metric ton of precipitate | 8.3725 | 10.460 |
| Kg. silver per metric ton of precipitate | 622.678 | 654.546 |

EXAMPLE 6

A second test is run on the same ore substituting for the polyacrylic acid, the same weight of polyacrylamide having a molecular weight of about 100,000 and about 40% hydrolyzed. Substantially the same results are obtained.

EXAMPLE 7

To a solution containing 1 oz./ton of silver and 0.05% sodium cyanide and 0.05% calcium oxide is added 0.075 lbs./ton of zinc dust which has been treated with a 0.1% solution of lead nitrate containing a total of 0.0075 lb. of lead nitrate per ton of pregnant solution.

The reagent used was a largely unpolymerized polyacrylic acid. The following results were obtained:

Solution:
  1 oz. silver
  0.05% NaCN
  0.05% CaO

| Reagent | Barren solution, oz./ton | Percent precipitated |
| --- | --- | --- |
| 0 blank | 0.134 | 86.6 |
| 1 p.p.m | 0.083 | 91.7 |
| 2 | 0.053 | 94.7 |
| 5 | 0.115 | 88.5 |
| 0.075 lb./ton zinc dust | 0.0075 Pb(NO$_3$)$_2$ | |

All weights and percentages in this specification and claims are by weight unless otherwise specifically stated.

I claim:

1. In the method of recovering precious metals selected from the group consisting of gold and silver from dilute deaerated alkaline cyanide solutions by precipitation with zinc dust, the improvement which comprises in combination therewith adding just prior to precipitation with zinc dust from 0.002 to 0.05 pound per ton of solution of a synthetic water-soluble polyelectrolyte having an average molecular weight of between about 5,000 and 100,000, and having a structure derived by the substantially linear polymerization of at least one monoolefinic compound through the aliphatic unsaturated group.

2. In the method of recovering gold and silver from a dilute deaerated alkaline cyanide solution thereof by precipitation with zinc dust, the improvement which comprises in combination therewith adding from 0.002 to 0.05 pound per ton of solution of a synthetic water-soluble polyelectrolyte having an average molecular weight of about 5000 to 100,000, and having a structure derived by the substantially linear polymerization of at least one monoolefinic compound through the aliphatic unsaturated group, in aqueous solution to the zinc dust before the zinc dust is added to the pregnant solution.

3. In the method of recovering gold and silver from a dilute deaerated alkaline cyanide solution thereof by precipitation with zinc dust, the improvement which comprises in combination therewith adding from 0.002 to 0.05 pound per ton of solution of polyacrylamide having an average molecular weight of about 5000 to 100,000, and a soluble lead salt to the zinc dust before adding the zinc dust to the pregnant solution.

4. In the method of recovering gold and silver from a dilute deaerated alkaline cyanide solution thereof by precipitation with zinc dust, the improvement which comprises in combination therewith adding from 0.002 to 0.05 pound per ton of solution of polyacrylic acid having an average molecular weight of about 5000 to 100,000, and a soluble lead salt to the zinc dust before adding the zinc dust to the pregnant solution.

5. In the method of recovering gold and silver from a dilute deaerated alkaline cyanide solution thereof by precipitation with zinc dust, the improvement which comprises in combination therewith adding from 0.002 to 0.05 pound per ton of solution of the sodium salt of hydrolyzed polyacrylonitrile having an average molecular weight of about 5000 to 100,000, and a soluble lead salt to the zinc dust before adding the zinc dust to the pregnant solution.

6. In the method of recovering gold from a dilute deaerated alkaline cyanide solution thereof by precipitation with zinc dust, the improvement which comprises in combination therewith adding from 0.002 to 0.05 pound per ton of solution of polyacrylamide having an average molecular weight of about 5000 to 100,000, and a soluble lead salt to the zinc dust before adding the zinc dust to the pregnant solution.

7. In the method of recovering gold from a dilute deaerated alkaline cyanide solution thereof by precipitation with zinc dust, the improvement which comprises in combination therewith adding from 0.002 to 0.05 pound per ton of solution of polyacrylic acid having an average molecular weight of about 5000 to 100,000, and a soluble lead salt to the zinc dust before adding the zinc dust to the pregnant solution.

8. In the method of recovering gold from a dilute deaerated alkaline cyanide solution thereof by precipitation with zinc dust, the improvement which comprises in combination therewith adding from 0.002 to 0.05 pound per ton of solution of the sodium salt of hydrolyzed polyacrylonitrile having an average molecular weight of about 5000 to 100,000, and a soluble lead salt to the zinc dust before adding the zinc dust to the pregnant solution.

References Cited in the file of this patent

UNITED STATES PATENTS

| | | |
| --- | --- | --- |
| 555,463 | MacArthur et al. | Feb. 25, 1896 |
| 900,186 | Merrill | Oct. 6, 1908 |
| 2,853,380 | Evans et al. | Sept. 23, 1958 |

UNITED STATES PATENT OFFICE
CERTIFICATE OF CORRECTION

Patent No. 3,033,675                          May 8, 1962

Norman Hedley

It is hereby certified that error appears in the above numbered patent requiring correction and that the said Letters Patent should read as corrected below.

Column 2, line 60, for "from" read -- form --; column 4, line 20, after "0.05" insert -- to 0.25 --; column 5, Table II, column 4, line 2 thereof, for "0.008" read -- 0.0008 --.

Signed and sealed this 4th day September 1962.

(SEAL)
Attest:

ERNEST W. SWIDER                         DAVID L. LADD
Attesting Officer                            Commissioner of Patents